US010504055B2

(12) United States Patent
Hance et al.

(10) Patent No.: US 10,504,055 B2
(45) Date of Patent: Dec. 10, 2019

(54) OPTIMIZATION OF WAREHOUSE LAYOUT BASED ON CUSTOMIZABLE GOALS

(71) Applicant: X Development LLC, Mountain View, CA (US)

(72) Inventors: Christopher Hance, Mountain View, CA (US); Daniel Shaffer, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 332 days.

(21) Appl. No.: 15/255,696

(22) Filed: Sep. 2, 2016

(65) Prior Publication Data

US 2018/0068255 A1    Mar. 8, 2018

(51) Int. Cl.
| | |
|---|---|
| *G06Q 10/08* | (2012.01) |
| *B65G 57/03* | (2006.01) |
| *B65G 61/00* | (2006.01) |
| *G06Q 10/04* | (2012.01) |
| *B65B 59/00* | (2006.01) |

(52) U.S. Cl.
CPC .......... *G06Q 10/087* (2013.01); *B65G 57/03* (2013.01); *B65G 61/00* (2013.01); *G06Q 10/043* (2013.01); *G06Q 10/0838* (2013.01)

(58) Field of Classification Search
USPC .......................................................... 705/28
See application file for complete search history.

(56) References Cited

U.S. PATENT DOCUMENTS

| 7,055,741 B2 | 6/2006 | Bong et al. |
|---|---|---|
| 8,075,238 B2 | 12/2011 | Wirz et al. |

(Continued)

FOREIGN PATENT DOCUMENTS

| JP | 2002-288248 A | 10/2002 |
|---|---|---|
| KR | 10-2015-0089793 A | 8/2015 |
| WO | 2015-125287 | 8/2015 |

OTHER PUBLICATIONS

International Search Report and Written Opinion prepared by the Korean Patent Office in International Application No. PCT/US2017/048983, dated Jan. 8, 2018.

(Continued)

*Primary Examiner* — Garcia Ade
(74) *Attorney, Agent, or Firm* — McDonnell Boehnen Hulbert & Berghoff LLP

(57) ABSTRACT

Example methods and systems enable rearrangement of a warehouse to an optimal layout determined according to customizable goals. An example method includes receiving, at a warehouse management system (WMS), information of a warehouse and items of the warehouse, identifying an item shipment expectation including new items expected to be received at the warehouse at a future date and items present at the warehouse marked for delivery at the future date, determining an optimal layout of the items of the warehouse at a present date based on the item shipment expectation, determining an amount of time to rearrange the items, by one or more of robotic devices rearranging the items, to the optimal layout based on a time measurement for robotic devices to perform tasks, and determining to rearrange the items of the warehouse based on the amount of time to rearrange the items being less than a threshold amount of time.

20 Claims, 5 Drawing Sheets

(56) References Cited

U.S. PATENT DOCUMENTS

| | | |
|---|---|---|
| 8,892,241 B2 | 11/2014 | Weiss |
| 8,965,562 B1 | 2/2015 | Wurman et al. |
| 9,111,251 B1 | 8/2015 | Brazeau |
| 9,120,622 B1 * | 9/2015 | Elazary ................. B25J 19/023 |
| 2004/0146380 A1 | 7/2004 | Baker et al. |
| 2008/0131255 A1 | 6/2008 | Hessler et al. |
| 2015/0073587 A1 * | 3/2015 | Vliet ...................... B65B 59/00 700/216 |
| 2016/0129592 A1 | 5/2016 | Saboo et al. |

OTHER PUBLICATIONS

International Preliminary Report on Patentability and Written Opinion in International Application No. PCT/US2017/048983, dated Mar. 14, 2019.

* cited by examiner

OPTIMIZATION OF WAREHOUSE LAYOUT BASED ON CUSTOMIZABLE GOALS

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may have machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

In one example, a method is described that comprises receiving, at a warehouse management system (WMS), real time inventory of items in a warehouse and real time location data of the items, and identifying an item shipment expectation including new items expected to be received at the warehouse at a future date and items present at the warehouse marked for delivery at the future date. The identifying is performed by the WMS and based on one or more of a receiving record, an order fulfillment and a shipping record. The method also includes determining an optimal layout of the items based on the item shipment expectation, and determining an amount of time for a robotic device to rearrange the items to the optimal layout based on a time measurement for the robotic device to perform a task. The method also includes determining to rearrange the items of the warehouse based on the amount of time to rearrange the items being less than a threshold amount of time, and causing the robotic device to rearrange the items to the optimal layout.

In another example, a system is described comprising a robotic device in a warehouse, a processor, and data storage comprising instructions executable by the processor to cause the system to perform operations. The operations comprise receiving real time inventory of the items in the warehouse and real time location data of the items, and identifying an item shipment expectation including new items expected to be received at the warehouse at a future date and items present at the warehouse marked for delivery at the future date. The identifying is based on one or more of a receiving record, an order fulfillment record and a shipping record. The operations also comprise determining an optimal layout of the items based on the item shipment expectation; determining an amount of time for the robotic device to rearrange the items to the optimal layout based on a time measurement for the robotic device to perform a task, determining to rearrange the items of the warehouse based on the amount of time to rearrange the items being less than a threshold amount of time, and causing the robotic device to rearrange the items to the optimal layout.

In still another example, a non-transitory computer-readable medium is described that has stored thereon program instructions that when executed by a computing system that includes at least one processor cause the computing system to perform operations. The operations comprise receiving real time inventory of items in a warehouse and real time location data of the items, and identifying an item shipment expectation including new items expected to be received at the warehouse at a future date and items present at the warehouse marked for delivery at the future date. The identifying is based on one or more of a receiving record, an order fulfillment and a shipping record. The operations also comprise determining an optimal layout of the items based on the item shipment expectation, determining an amount of time for a robotic device to rearrange the items to the optimal layout based on a time measurement for the robotic device to perform a task, determining to rearrange the items of the warehouse based on the amount of time to rearrange the items being less than a threshold amount of time, and causing the robotic device to rearrange the items to the optimal layout.

In yet another aspect, a system is provided that includes a means for receiving, at a warehouse management system (WMS), real time inventory of items in a warehouse and real time location data of the items. The system also includes a means for identifying an item shipment expectation including new items expected to be received at the warehouse at a future date and items present at the warehouse marked for delivery at the future date. The system also includes a means for determining an optimal layout of the items based on the item shipment expectation. The system also includes a means for determining an amount of time for a robotic device to rearrange the items to the optimal layout based on a time measurement for robotic devices of the robotic device to perform a task. The system also includes a means for determining to rearrange the items of the warehouse based on the amount of time to rearrange the items being less than a threshold amount of time, and means for causing the robotic device to rearrange the items to the optimal layout.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
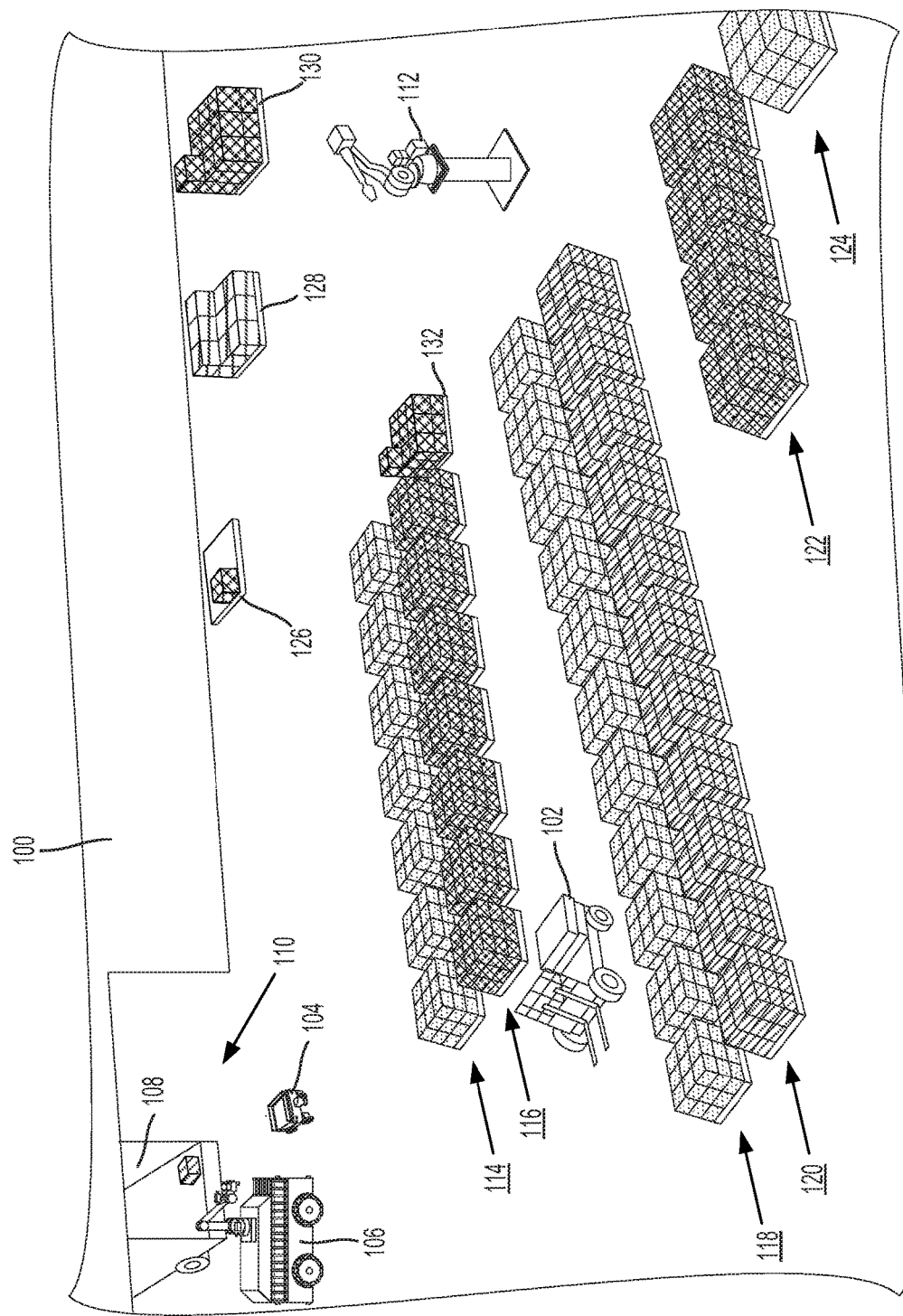
FIG. 1 depicts an example warehouse in accordance with at least some implementations described herein.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the context clearly dictates otherwise, the terms "a" or "an" means at least one, and the term "the" means the at least one.

As used herein, the term "warehouse" may refer to any physical environment in which items or pallets of items may be manipulated, processed, and/or stored by robotic devices. In some examples, a warehouse may be a single physical building or structures. In other examples, some fixed components may be installed or otherwise positioned within the environment before or during object processing. In additional examples, a warehouse may include multiple separate physical structures or buildings, and/or may also include physical spaces that are not covered by a physical structure as well.

An example warehouse may include a homogeneous or heterogeneous group of robotic devices and a control system configured to manage the robotic devices. In the context of a warehouse, such a control system can be referred to as a warehouse management system (WMS). The warehouse may also include a variety of items (e.g., products) arranged on pallets, and the pallets may be arranged in various positions in the warehouse. For instance, pallets may be positioned directly on the floor of the warehouse, stacked on other pallets, placed in pallet racks, and/or stored in shipping containers. Furthermore, the warehouse may include items arranged separately (not on pallets), and included in customized containers, boxes, or not included in any container.

A group of robotic devices may be used in a warehouse setting for a number of different applications. One possible application includes order fulfillment (e.g., for individual customers), in which pallets may be opened and individual items from the pallets may be put into packaging within boxes to fulfill individual orders. Another possible application includes distribution (e.g., to stores or other warehouses), in which mixed pallets may be constructed containing groups of different types of items (i.e., types of products) to ship to a store. A further possible application includes cross-docking, which may involve transporting between shipping containers without storing anything (e.g., items may be moved from four 40-foot trailers and loaded into three lighter tractor trailers, and could also be palletized). Numerous other applications are also possible.

As a general matter, the manner in which pallets are arranged in the warehouse may depend on various factors. Such factors may include a history of activities in the warehouse, a history of pallet locations, a history of demand for certain items, a trend of items received at the warehouse, a trend of items shipped out of the warehouse, a received order for items, a forecasted activity in the warehouse, a forecasted demand for certain items, a forecasted item to be received at the warehouse, a forecasted item to be shipped out of the warehouse, a business goal (e.g., promotional offers such as same-day delivery), and human and/or robotic resource availability to arrange the pallets, among many other possibilities. The WMS may be configured to use these and other factors with machine learning to facilitate improved management of the warehouse, including the arrangement and rearrangement of pallets in the warehouse.

Described herein are example methods and systems for autonomously rearranging—or, "shuffling"—pallets in the warehouse. In accordance with an example method, the WMS may receive, determine, or otherwise access real-time item information including real-time locations of pallets of items in the warehouse, a real-time inventory of items in the warehouse, and real-time content of each pallet (e.g., which items are on which pallets). The WMS may also receive, determine, or otherwise have access to other warehouse information such as pallet relocation history (e.g., information relating to when, where, why, and/or how a pallet was moved from one place to another), expectations of items to be received at the warehouse, and expectations of items to be shipped out of the warehouse.

The WMS further identifies, based on access to a receiving record as well as an order fulfillment and shipping record, an item shipment expectation including new items expected to be received at the warehouse at a future date and items present at the warehouse marked for delivery at the future date, and then can determine an optimal layout of the items of the warehouse at a present date based on the item shipment expectation.

Further, the WMS may determine what resources would be needed to rearrange the warehouse into the optimal layout, such as the time it would take for robotic devices to rearrange the pallets. If the WMS determines that resources meet certain criteria, the WMS may then instruct the robotic devices to rearrange the pallets. If not, the WMS may not instruct the robotic devices to rearrange the pallets until the WMS determines that the resources meet certain criteria.

In examples, to facilitate this in practice, the WMS may receive, determine, or otherwise have access to real-time robotics information relating to robot activities in the warehouse. As an example, the real-time robotics information may include real-time locations of the robotic devices, real-time task progress updates for robotic tasks that are in-progress and/or to-be-completed, a task schedule, and respective measurements of how much time the robotic devices will take to perform various tasks, among other possible information. The WMS may then use at least the real-time robotics information to determine how long it would take the robotic devices to rearrange the pallets to the optimal dense grid layout. If the amount of time is less than a threshold amount of time, the WMS may instruct the robotic devices to rearrange the pallets to the optimal dense grid layout. The threshold may be dynamic, for example, and can be based on a projected or actual robot availability. Additionally, the WMS may consider parameters, in addition to time, when determining whether to instruct the robotic devices to rearrange the pallets such as power usage, carbon emissions, distance to move items, etc.

Dynamically and autonomously rearranging pallets in the warehouse may provide various industrial and business advantages. For example, the use of the WMS and robotic devices may greatly reduce or eliminate the need for human labor in rearranging the warehouse. As another example, as demand for items changes over time, the WMS may change the layout of pallets to best reflect the current demand at various points in time, or may proactively change the layout of pallets to best reflect forecasted demand at a future point in time. As yet another example, as available space in the warehouse increases and decreases, the WMS may balance a consideration of available space with other considerations, such as demand, ease of access to items, etc., to determine what type of layout would best utilize the available space in the warehouse in light of those considerations. Other examples are possible as well.

It should be noted that in alternate implementations, one or more computing entities associated with the warehouse, such as the WMS and/or other computing systems, may gather, update, process, and/or provide for receipt by the WMS the item information and/or the robotics information less frequently than in real-time.

Reference will now be made in detail to various implementations, examples of which are illustrated in the accompanying drawings. In the following detailed description, numerous specific details are set forth in order to provide a thorough understanding of the present disclosure and the described implementations. However, the present disclosure may be practiced without some of these specific details. In other instances, well-known methods, procedures, components, and circuits have not been described in detail so as not to unnecessarily obscure aspects of the implementations.

Referring now to the figures, FIG. 1 depicts an example warehouse 100 in accordance with at least some implementations described herein. The warehouse 100 includes various types of robotic devices that may be controlled to collaborate to perform tasks related to the processing of items, pallets, etc. within the warehouse. Certain example types and numbers of different robotic devices are shown here for illustration purposes, but the warehouse may employ more or fewer robotic devices, may omit certain types shown here, and may also include other types of robotic devices not explicitly shown.

One example type of robotic device shown in FIG. 1 is an autonomous fork truck 102, a mobile device with a forklift that may be used to transport pallets of boxes and/or to lift pallets of boxes (e.g., to place the pallets onto a rack for storage), or to transport and/or lift boxes themselves. Another example type of robotic device shown is an autonomous guided vehicle (AGV) 104, which may be a relatively small, mobile device with wheels that may function to transport individual items or other objects from one location to another within the warehouse. An additional example type of robotic device is a robotic truck loader/unloader 106, a mobile device with a robotic manipulator as well as other components such as optical sensors to facilitate loading and/or unloading items and/or pallets onto and/or off of trucks or other vehicles. For instance, robotic truck unloader 106 may be used to load a pallet or individual items onto delivery truck 108, which is located at a shipping dock 110 of the warehouse. In some examples, movements of delivery truck 108 (e.g., to deliver packages to another warehouse) may also be coordinated with robotic devices in the warehouse.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for a task such as moving objects or collecting sensor data of the environment. Any of the robotic devices described herein may include one or more sensor(s) such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, audio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) may provide sensor data to a processor(s) to allow for appropriate interaction of a robotic device with the environment. Additionally, a robotic device may also include one or more power source(s) configured to supply power to various components of the robotic device. Any type of power source may be used such as, for example, a gasoline engine or a battery.

In further examples, the warehouse 100 may also include various fixed components or fixed robotic devices. A fixed robotic device may be used to move or otherwise process items. For instance, a pedestal robot 112 may include a robotic arm elevated on a pedestal that is fixed to the ground floor within the warehouse. The pedestal robot 112 may be controlled to distribute items between other robots and/or to stack and unstack pallets of items. For example, the pedestal robot 112 may pick up and move boxes from nearby pallets and distribute the items to individual AGV's 104 for transportation to other locations within the warehouse.

In further examples, the warehouse 100 may include an additional fixed component, such as a storage rack (not shown) that may be used to store pallets and/or other objects within the warehouse. Such a storage rack may be designed and positioned to facilitate interaction with one or more robotic devices, such as autonomous fork truck 102. In addition to or alternative to a storage rack, certain ground space in the warehouse 100 may be selected and used for storage of pallets. For instance, some pallets may be positioned within the warehouse environment at chosen locations for certain periods of time to allow the pallets to be picked up, distributed, or otherwise processed by a robotic device. Any fixed component in warehouse 100 may be equipped with one or more sensors, as described herein.

In some examples, any or all of the robotic devices in the warehouse 100 may include one or more sensors, one or more computers, and one or more robotic arms or robotic manipulators. A sensor may be used to perform various operations, such as scanning areas within the warehouse 100 in order to capture visual data and/or three-dimensional (3D) depth information. Data from a scan may then be integrated into a representation of larger areas in order to provide digital environment reconstruction. In additional examples, the reconstructed environment may then be used for identifying items, pallets, or other objects to pick up, determining pick positions for items or pallets, and/or planning a collision-free trajectory along which robotic devices should travel. The warehouse 100 may also include sensors such as cameras or other types of sensors that are not connected to robotic devices. For instance, various sensors may be affixed to various locations in the warehouse, such as a wall, a ceiling, etc.

As shown in FIG. 1, the warehouse 100 includes a variety of pallets, each of which may contain one type of item or may contain multiple types of items. As an example, the warehouse 100 includes rows 114, 116, 118, 120, 122, and 124, each of which includes a line of pallets that contain the same type of item. For instance, the pallets of row 114, row 118, and row 124 may each include a first type of item, the pallets of row 116 and row 122 may each include a second type of item, and the pallets of row 120 may each include a third type of item.

Some pallets in rows 114, 116, 118, 120, 122, and 124 may be considered "full" pallets—namely, pallets that contain the maximum quantity of items allotted per pallet. The maximum quantity of items allotted per pallet may be the same or different for multiple pallets, and may be a quantity defined by the WMS or by a human. Further, the maximum quantity of items allotted per pallet may depend on various factors, such as pallet structure (e.g., the maximum weight that a pallet can support). By comparison, the warehouse 100 may also include various pallets that are less than full, such as pallet 126, pallet 128, pallet 130, and pallet 132. Each of these pallets may include the same type of item or may include different types items.

The manner in which the pallets are positioned in the warehouse 100 shown in FIG. 1 may be an example of a deep lanes layout. For example, row 114 and row 116 may together form a first lane, row 118 and row 120 may together form a second lane, and row 122 and row 124 may together form a third lane. The first, second, and third lanes may each be separated by a predetermined distance, such as a distance that enables robotic devices (e.g., autonomous fork truck 102) to travel between the lanes and access pallets in the lanes.

Lanes, rows, and pallets can be organized differently from the example shown in FIG. 1. For instance, in other deep lanes layouts, an entire first lane may contain only a first type of item, and an entire second lane may contain only a second, different type of item. Further, the amount of pallets that make up the width and length of each lane can be increased or decreased.

In some examples, the warehouse 100 may additionally include a battery exchange and/or a battery charging station (not shown). In examples, some or all of the mobile robotic devices such as the autonomous fork truck 102 or AGV 104 may periodically receive a charged battery from a battery exchange station equipped with multiple battery chargers. In an example, the battery exchange station may replace a robotic device's old battery with a recharged battery, which may prevent robotic devices from having to sit and wait for a battery to charge. The battery exchange station may be equipped with a robotic manipulator such as a robotic arm. The robotic manipulator may remove batteries from an individual mobile robotic device and attach the batteries to available battery chargers. The robotic manipulator may then move charged batteries located at the battery exchange station into the mobile robotic device to replace the removed batteries. For instance, an AGV with a weak battery may be controlled to move over to a battery exchange station where a robotic arm pulls a battery out from the AGV, puts the battery in a charger, and gives the AGV a fresh battery.

In examples, one or more robotic devices may be brought into the warehouse 100 to create a map of the warehouse 100 space before determining placement of other objects, such as any fixed robotic devices or components discussed above, as well as any pallets. Herein, a "map" refers to information representative of a positioning of elements in an area of an environment, and/or representative of a relationship of certain elements to other elements or to the environment. In example implementations, a map is a digital map, determined by collecting and compiling data representative of relationships between elements in the given environment, and then formatting such data into a virtual form, such as a virtual 2D or 3D image. A map can be a real-time or non-real-time representation of the elements and environment at issue, detailing such elements, the environment, and/or points of interest on such elements and/or in the environment.

Once map information is available, a computing system such as the WMS may determine (e.g., by running simulations) how to lay out such components within the space available. In certain cases, a layout may be chosen to minimize the amount of space taken up by the objects. Pallets may be placed at predetermined locations or can be placed at random in other examples. Further, pallets may be placed using an intelligent optimization approach based on a number of factors as described herein in which predetermination locations or randomness may be one or more of the factors as well.

To coordinate actions of various devices within the warehouse 100 (e.g., the robotic devices, and possibly other components such as a battery charging station, remotely-controlled shipping dock doors, remotely-controlled ramps, etc.), a global control system, such as a remote, cloud-based server system, may communicate (e.g., through wireless communication) with some or all of the components and/or with separate local control systems of individual components. Any computing system described herein, such as a WMS, may take the form of such a global control system.

Figure 2:
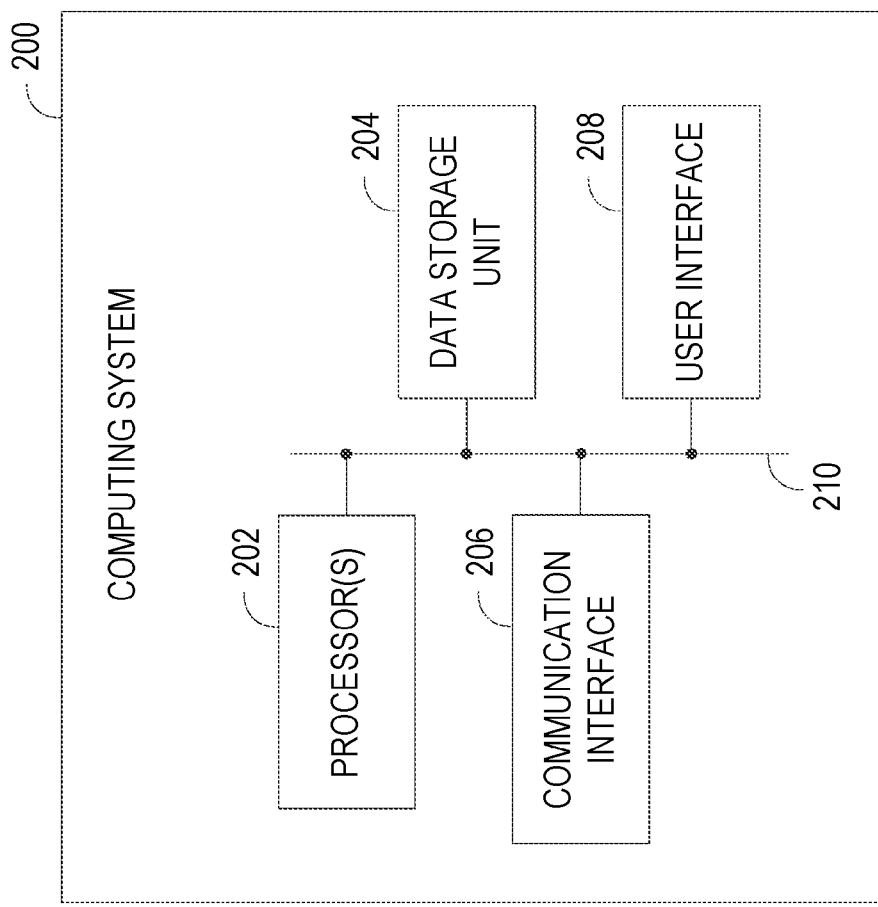
FIG. 2 is a simplified block diagram illustrating components of an example computing system, in accordance with at least some implementations described herein.

FIG. 2 is a simplified block diagram illustrating components of an example computing system 200, in accordance with at least some implementations described herein. For instance, computing system 200 can serve as a WMS and control aspects of a warehouse such as the warehouse 100, including dynamically controlling operations of robotics devices or other components in the warehouse, as noted above. As such, computing system 200 can include various components, such as processor(s) 202, data storage unit 204, communication interface 206, and/or user interface 208. The components of computing system 200 can be connected to each other (or to another device, system, or other entity) via connection mechanism 210. In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless). Computing system 200 can include more or less components in other example implementations.

Processor 202 may take the form of a general-purpose processor (e.g., a microprocessor) and/or a special-purpose processor (e.g., a digital signal processor (DSP)). In some instances, computing system 200 may include a combination of processors.

Data storage unit 204 may include one or more volatile, non-volatile, removable, and/or non-removable storage components, such as magnetic, optical, or flash storage, and/or can be integrated in whole or in part with processor 202. As such, data storage unit 204 may take the form of a non-transitory computer-readable storage medium, having stored thereon program instructions (e.g., compiled or non-compiled program logic and/or machine code) that, when executed by processor 202, cause computing system 200 to perform one or more acts and/or functions, such as those described in this disclosure. Computing system 200 can be configured to perform one or more acts and/or functions, such as those described in this disclosure. Such program instructions can define and/or be part of a discrete software application. In some instances, computing system 200 can execute program instructions in response to receiving an input, such as from communication interface 206 and/or user interface 208. Data storage unit 204 may also store other types of data, such as those types described in this disclosure.

Communication interface 206 can allow computing system 200 to connect to and/or communicate with another other entity according to one or more protocols. In an example, communication interface 206 can be a wired interface, such as an Ethernet interface or a high-definition serial-digital-interface (HD-SDI). In another example, communication interface 206 can be a wireless interface, such as a cellular or Wi-Fi interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 208 can facilitate interaction between computing system 200 and a user of computing system 200, if applicable. As such, user interface 208 can include input components such as a keyboard, a keypad, a mouse, a touch sensitive panel, a microphone, and/or a camera, and/or output components such as a display device (which, for example, can be combined with a touch-sensitive panel), a sound speaker, and/or a haptic feedback system. More generally, user interface 208 can include hardware and/or software components that facilitate interaction between computing system 200 and the user of the computing device system.

As indicated above, computing system 200 may be configured to dynamically control aspects of a warehouse, such as by coordinating operation of robotic devices operating in the warehouse. As an example, computing system 200 may determine for a given robotic device a schedule that indicates a series of tasks for the robotic device to perform throughout an entire period of time and adjust the schedule using subsequent information received from the robotic device (e.g., sensor data, task progress updates), other robotic devices, and/or other systems (e.g., a sensor system) positioned in the warehouse. As another example, computing system 200 may be configured to coordinate operations for multiple robotic devices, including aligning schedules so that two or more robotic devices are located in the same area during a period of time, perhaps in case the computing system has predicted that the two or more robotic devices may be needed to assist with another task in that area during that time. As yet another example, computing system 200 may also arrange schedules so as to not have a threshold high amount of robotic devices performing tasks in the same area during the same period of time, thereby avoiding generation of excess traffic in the warehouse. As yet another example, computing system 200 may alter the schedules of one or more robotic devices to save resources, such as by cancelling a first robotic device's scheduled pickup of a pallet when a second robotic device is closer in distance to the pallet than the first robotic device, and instead instructing the second robotic device to pick up the pallet.

In some examples, computing system 200 may function as or include a central planning system that assigns tasks to different robotic devices. Herein, a "task" refers to an operation that is assigned to at least one entity for that entity or entities to perform. In example implementations, such a task is assigned to the at least one entity by a system that monitors, governs, or otherwise manages the at least one entity in order to facilitate a performance of the task by the at least one entity.

The central planning system may employ various scheduling algorithms to determine which devices will complete which tasks at which times. For instance, the central planning system may assign tasks to robots to minimize overall costs of specific robots that perform the tasks. In additional examples, the central planning system may optimize across one or more different resources, such as time, space, or energy utilization. In further examples, a planning or scheduling system may also incorporate aspects of the geometry and physics of box picking, packing, or storing.

Planning control may also be distributed across individual system components. For example, computing system 200 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

To facilitate planning control, computing system 200 may employ various techniques to monitor the locations of robotic devices in the warehouse 100. These locations may be real-time locations. To further facilitate planning control, in some implementations, robotic devices may be configured to continuously or periodically "publish" (e.g., transmit) their locations to computing system 200 so that computing system 200 can in turn update the locations of the robotic devices. Computing system 200 and/or the robotic devices can employ other techniques as well to facilitate monitoring locations of the robotic devices.

Real-time may refer to the actual time during which a process or event occurs, and thus, a real-time location refers to a physical location of the robotic device as determined within a threshold amount of time (e.g., determined within a few seconds) so that the physical location of the robotic device at a certain time is known with certainty.

In additional examples, a central planning system may be used in conjunction with local vision systems on individual robotic devices to coordinate functions of various robotic devices. For instance, a central planning system may be used to get robotic devices at least relatively close to where they need to go. However, it may be difficult for the central planning system to command robots with millimeter precision, unless the robotic devices are bolted to rails or other measured components are used to precisely control robot positions. Local vision systems and planning for individual robotic devices may therefore be used to allow for elasticity between different robotic devices. A general planner may be used to get a robotic device close to a target location, at which point local vision system of the robotic device may take over. In some examples, most robotic functions may be position-controlled to get the robots relatively close to target locations, and then vision systems and handshakes may be used when needed for local control.

A visual handshakes may enable two robotic devices to identify one another by use of quick response (QR) codes or other characteristics, and to perform collaborative operations within the warehouse 100. In additional examples, an item (e.g., packages to be shipped) may be provided with visual tags as well or instead. A visual tag may be used by a robotic device to perform an operation on the item using a local vision system. In an example, a tag may be used to facilitate manipulation of the item by the robotic device. For instance, a tag on a location on a pallet may be used to inform a forklift where or how to lift up the pallet.

Within additional examples, robotic devices may use their local vision systems to scan and identify individual items or pallets of items during tasks in which robotic devices need to manipulate the items/pallets in some manner. To facilitate this in part, for instance, a given item/pallet may include a machine-readable code (e.g., QR code or barcode) having encoded information about the given item/pallet. As a result of the scanning, the machine-readable code may provide a robotic device's local computing system and/or computing system 200 with the information about the given item/pallet. For instance, for a pallet, such information may include what type of item the pallet carries. Pallets may also include a radio frequency identification (RFID) tag contained on the pallet and/or one or more boxes known to be located as part of pallet. Further, such information gain by scanning the pallets or by communication with the RFID may include a history of the pallet, such as (i) where in the warehouse the pallet has been, (ii) how many times the pallet has been moved, (iii) when the pallet was moved, (iv) indications of damage to the pallet, if any, and (v) whether the pallet is marked for delivery to another area of the warehouse (e.g., a shipping dock, or for storage in another area), among other types of information. A given item/pallet may additionally or alternatively include a label or other source of such information that the robotic device can scan to identify the item/pallet and obtain such information.

Scanning items/pallets in this manner may have various advantages, such as locating and keeping track of items/pallets as they are moved into, out of, and around the warehouse 100. Further, a potential benefit of such scanning is added transparency, both on the supplier side and the consumer side. On the supplier side, for example, information about current locations of inventory may be used to avoid overstocking and/or to move items/pallets to different locations or warehouses to anticipate demand. On the consumer side, for example, the information about current locations of items may be used to determine when an item/pallet will be delivered with improved accuracy.

Within additional examples, computing system 200 may over time optimize deployment and/or planning strategies for fixed and/or mobile components. For instance, computing system 200 (e.g., a cloud-based server system) may incorporate data and information from individual robotic devices within the warehouse and/or from external sources. Strategies may then be refined over time to enable the robotic devices to use less space, less time, less power, less electricity, or to optimize across other variables. In some examples, optimizations may span across multiple warehouses, possibly including other warehouses with other robotic devices and/or traditional warehouses without such robotic devices. For instance, computing system 200 may incorporate information about delivery vehicles and transit times between facilities into central planning.

Similarly, computing system 200 may over time optimize planning strategies to meet existing demand for items (e.g., current orders for products), meet forecasted demand for items, meet certain business goals, etc.

In some examples, a central planning system may sometimes fail, such as when a robotic device gets stuck or when items get dropped in a location and lost. A local vision system may also therefore provide robustness by inserting redundancy to handle cases where the central planner fails. For instance, as an automated pallet jack passes and identifies an item, the pallet jack may send information up to a remote, cloud-based server system. Such information may be used to fix errors in central planning, help to localize robotic devices, or to identify lost items.

In further examples, computing system 200 may dynamically update a map of the warehouse 100 and objects undergoing processing by the robotic devices. In some examples, the map may be continuously updated with information about dynamic objects (e.g., moving robotic devices and items/pallets moved by robotic devices). In additional examples, a dynamic map could contain information on both the current arrangement of objects within a warehouse (or across multiple warehouses) as well as information about what is anticipated in the future, such as in the near term (e.g., in upcoming seconds, minutes, hours, or even days) or long term (e.g., in upcoming weeks, months, or even years). For instance, the map could show current locations of moving robotic devices and anticipated locations of the robotic devices in the future, which may be used to coordinate activity between robotic devices. The map could also show current locations of items undergoing processing as well as anticipated future locations of the items (e.g., where an item is now and when the item is anticipated to be shipped out). Further, the map could show anticipated locations of items that have yet to arrive at the warehouse. For instance, computing system 200 may consider a history of orders for items, forecasted orders, a history of pallet relocation, and/or other known or predicted information to cause the map to show where pallets of items should be placed in the warehouse when they arrive.

In line with the discussion above, computing system 200 may also schedule battery exchanges, power charging, and any other scheduled maintenance that may be needed. For instance, individual mobile robotic devices may be configured to monitor their battery charge status. The robotic devices may send information to computing system 200 indicating the status of their batteries. This information may then be used by computing system 200 to schedule battery replacements for individual robotic devices when needed or convenient.

As discussed above, the computing system 200 can serve as the WMS, that executes instructions stored on the data storage unit 204 to determine optimal layouts of a warehouse. Traditionally, an arrangement of a warehouse is static where pallets are positioned in preset locations. However, as shipments change (e.g., daily, seasonally), methods described herein enable dynamic rearrangement of the warehouse based on a number of possible factors. As an example, seasonal items can be positioned toward a rear of the warehouse when those items are out of season, and similarly excess inventory of items can also be placed toward the rear. The layout is not constrained to any fixed layout of the warehouse, and can be determined dynamically and any layout can be optimal based on the factors considered. With the physical location of every pallet in the warehouse known, as well as a content of pallets known, shipping orders can be accessed to determine items that will be processed for shipment and receiving records can be accessed to determine items expected to be received. All of these factors can be processed to generate an optimal layout of the warehouse at a present time.

The optimal layout can be based on a customizable goal, such as to enhance storage capacity of the warehouse. In instances in which storage capacity is needed, the layout can be modified to use aisles of a narrower width instead of a larger width which may trade off outbound throughput (e.g., access to items in pallets) to increase storage capacity. The layout may be optimized for a day or a season of the year, or to optimize for storage capacity or outbound throughput.

Figure 3:
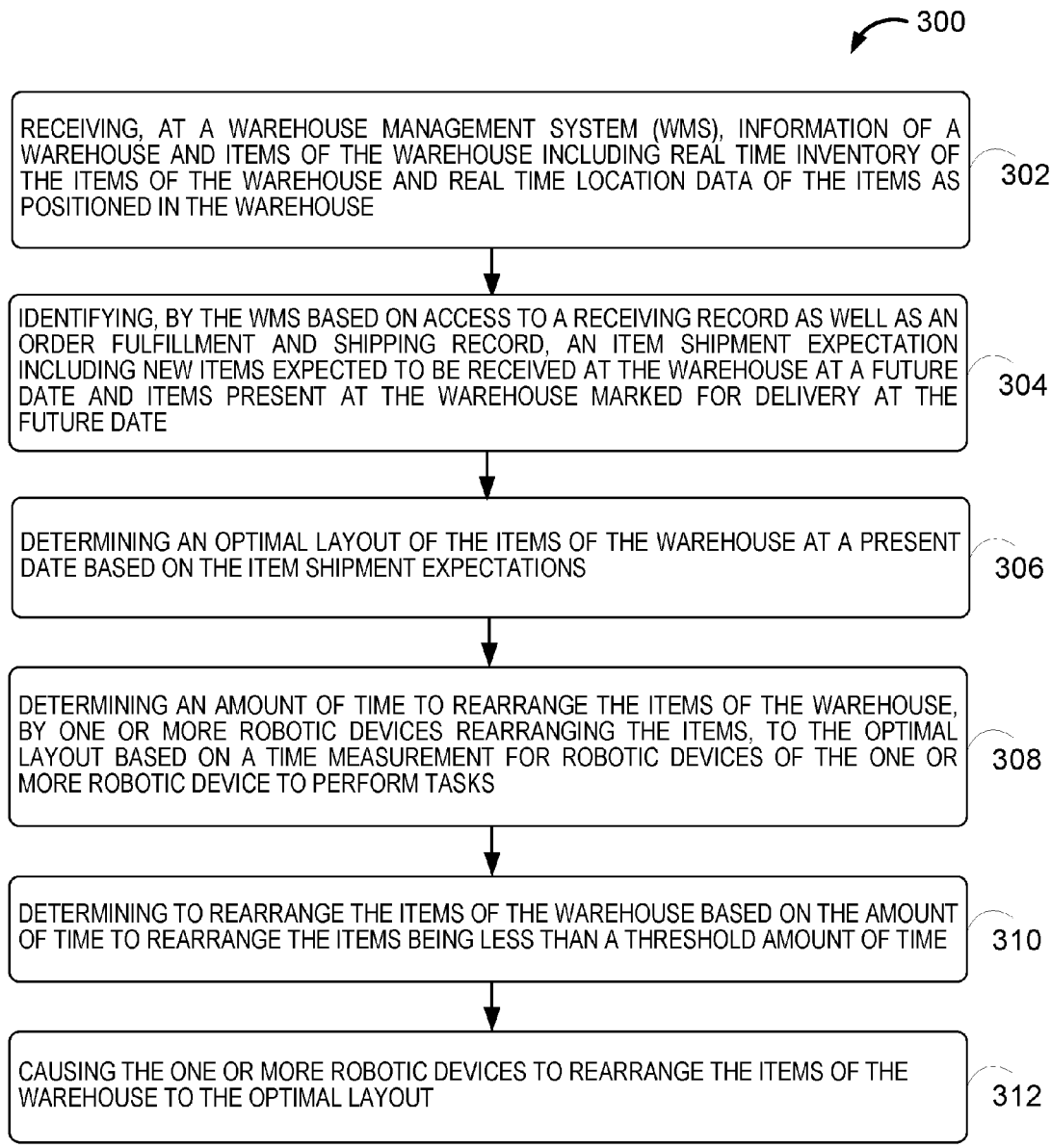
FIG. 3 is a flowchart of an example method, in accordance with at least some implementations described herein.

FIG. 3 is a flowchart of an example method 300, in accordance with at least some implementations described herein. The method 300 shown in FIG. 3 presents an implementation of a method that, for example, could be used with devices, components, and systems shown in FIGS. 1 and 2, for example, or may be performed by a combination of any components of those Figures. The method 300 may include one or more operations, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows operation of one possible implementation. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical operations in the process.

Operations of the method, and operations of other methods and processes disclosed herein, are described as performed by a WMS in some examples, such as computing system 200. However, these operations may be performed in whole or in part by other entities or combinations of entities. For example, these operations may be managed by a central server, which can distribute operations to smaller peer-to-peer networks or servers that may manage portions of the robotic devices. In addition, in examples, the WMS may be a cloud-based computing system, or other entity configured to manage at least a portion of the robotic devices to rearrange a layout of the warehouse.

At block 302, the method 300 includes receiving, at a warehouse management system (WMS), information of a warehouse and items of the warehouse including real time inventory of items in the warehouse and real time location data associated with the items as positioned in the warehouse. The items in the warehouse are arranged on pallets, and the WMS receives information as to positioning of the pallets in the warehouse as well as a content of each pallet. In some examples, the information as to positioning of the pallets, and other real time location data, may be provided to the WMS using sensors, trackers, transmitters, or other identifiers coupled to pallets or objects in the warehouse and its environs (e.g., loading bays, parking areas, adjacent storage units, etc.). The WMS may plan and manage an arrangement and activities of the warehouse. For example, the WMS can use the real time inventory to determine where to store items to be received on a next business day, based on purchase order and customer order data, and after an item is received, determines where to store the item.

At block 304, the method 300 includes identifying, by the WMS based on access to one or more of a receiving record, an order fulfillment and a shipping record, an item shipment expectation including one or more new items expected to be received at the warehouse at a future date and one or more items present at the warehouse marked for delivery at the future date. The order fulfillment and shipping records can be sent to the WMS electronically, or stored on the WMS as well. In addition, the WMS may access the order fulfillment and shipping records through a network.

At block 306, the method 300 includes determining an optimal layout of the items in the warehouse at a present date based on the item shipment expectations. The optimal layout of the items in the warehouse also may be determined based on business goals including dates for promotions on items, or forecasting of quantities of items to be delivered.

Example layouts of the warehouse are illustrated in FIGS. 4-8, as described in detail below.

The determination of the optimal layout of the items of the warehouse at a present date can be based on many factors. Optimizations may be determined by analyzing rearrangements previously performed to determine a cost to switch layouts. The optimization may be based on an output of a cost function that considers a number of parameters. Some parameters includes an amount of expected time to deplete inventory, an amount of storage capacity required for inbound items, and one or more deadlines for a shipment of items.

In addition, the determination of the optimal layout can be performed by access to stored configurations of the warehouse, or from past arrangements of the warehouse. For example, items in the warehouse may be configured in a desired manner, and the specific configuration can be noted and stored in memory, such as by imaging the warehouse to note physical locations and positions of pallets. The configuration can be associated with specific parameters, e.g., storage capacity parameters, outbound throughput parameters, and for a future rearrangement of the warehouse, a user can input parameters into the WMS, which then accesses stored configurations to determine an associated optimal layout based on the parameters input.

An example layout can include a dense grid layout, in which pallets are stored densely, while still allowing pallets that are predicted to be (or known to be) in higher demand to be easier for robotic devices to access in case the pallets need to be moved for various purposes, thereby controlling how robotic devices access the pallets. The dense grid layout may have various characteristics. At a minimum, for instance, a distance of a given pallet from a center of a drive lane of the dense grid layout may be related to the likelihood of demand for the given pallet.

As another example, an optimal layout can include a deep lanes layout, which may be defined by various characteristics. At a minimum, for instance, a deep lanes layout may include groups of pallets arranged in respective lanes in which some pallets are not immediately accessible from travel or drive lines due to being set back behind other pallets. Other layouts are possible as well.

At block 308, the method 300 includes determining an amount of time to rearrange the items of the warehouse, by one or more robotic devices rearranging the items, to the optimal layout based on a time measurement for robotic devices of the one or more robotic device to perform tasks.

A plurality of robotic devices may be used for this purpose as well. The robotic devices can perform tasks within known time frames, in contrast to human labor that introduces variability into events. The time measurement may thus be a fixed time measurement. It can be determined that moving a pallet across the warehouse to a new location by a specific robotic device will require a certain amount of time. In addition, with a fleet of robotic devices, the WMS can program each individual robotic device in a way in which none of the robotic devices cross paths or cause conflicting actions to any others. This enables each robotic device to operate efficiently independently or jointly, and the fleet to operate efficiently to perform the rearrangement of the warehouse.

The WMS may access a database that stores known amounts of time for performing specific tasks by specific robotic devices, and can determine the amount of time in total to rearrange the warehouse in this way. In other examples, time for performing specific tasks by specific robots can be computed in real-time with a high-fidelity simulation of the tasks in which a simulation is performed to estimate the time to perform the task with the available robots.

At block 310, the method 300 includes determining to rearrange the items of the warehouse based on the amount of time to rearrange the items being less than a threshold amount of time. Thus, generally, if there is an amount of time available in which the robotic devices can complete the rearrangement, the WMS will determine to do so. In practice, the rearrangement can occur overnight when human workers are not present and warehouse operations are completed for the day. In some example, time may be only one constraint that is considered when deriding whether to undertake the optimization, and other additional constraints may also be considered such as current inventory of the warehouse, future orders, future deliveries, number of robotic devices available, current and future battery statuses of the robotic devices, operation of robotic devices that may conflict, etc.

A cost function can associate values with any and all of the parameters considered to generate a cost to rearrange the warehouse 100, and if the cost is less than a threshold, then it can be determined beneficial to perform the rearrangement. The cost function can be maximized or minimized subject to the parameters or constraints. Depending on the goals desired to be achieved, an example cost function may include:

$$F(x)=\text{storage}+\text{pallets}(A\text{-}H)/\text{shipping}+\text{open docks}$$

where storage refers to an amount of square foot storage needed, pallets (A-H)/shipping refers to the requirement to have such pallets proximate to shipping docks, and open docks refers to the requirement to have all shipping docks open and available for use. Values to associate with such parameters may be based on a 0-100 point system, with zero indicating a low priority and 100 indicating a necessity. If the cost function in this example scenario is less than a threshold amount of points, for example, the rearrangement may be considered recommended, and if the rearrangement can occur in the threshold amount of available time, the WMS determines to perform the rearrangement. In other examples, the cost function can be setup as a constrained optimization in which an objective function is established with respect to some variables in the presence of constraints on those variables. A constraint can be either a hard constraint which set conditions for the variables that are required to be satisfied, or a soft constraint which has some variable values that are penalized in the objective function if, and based on the extent that, the conditions on the variables are not satisfied. Here, the cost function can be processed to attempt to, for example, minimize the 95th percentile order fulfillment latency, subject to constraints that all shipping dock doors be available for use. Other goals may be set as well.

A value to the cost function can be input by a user or received by the WMS from a user interface, and a threshold for the cost function can also be set by a user. In further examples, an input to the cost function may be inferred based on a goal to minimize cost or latency or maximize throughput, based on predicted and known future incoming and outgoing goods.

Other example cost functions may be used as well, and can consider storage capacity requirements of the warehouse for the future dates, and well as optimal layouts satisfying an outbound throughput of items (e.g., access to items along drive lanes in the warehouse) while also providing a storage capacity requirement for the future dates. The outbound throughput of items also refers to an ability to access items in a timely manner. For example, if items are positioned in areas inaccessible due to blocked drive lanes, the outbound throughput is delayed as the items are unpacked.

At block 312, the method 300 includes causing the one or more robotic devices to rearrange the items of the warehouse to the optimal layout. The WMS may send electronic messages (e.g., wirelessly) to each robotic device informing of specific tasks to accomplish the rearrangement, and the robotic devices then can rearrange the items of the warehouse to the optimal layout. Tasks may include any of those described with reference to FIG. 1 so as to move items in the warehouse 100 from one physical location to another, or to combine pallets as well.

In examples, robotic devices can communicate progress and completion of a performance of a given task to the WMS. Accordingly, the WMS may cause at least one of the one or more robotic devices to perform another task consecutive to the given task responsive to the message indicating the completion of the performance of the given task phase.

The method 300 includes more than just organizing items within the warehouse 100 for an efficient order fulfillment, as the items can be rearrangement to take into account any number of parameters that weight outbound throughput as compared to storage capacity requirements. In addition, the rearrangement is performed by unmanned robotic devices that operate based on received instructions, and according to known time frames to perform a task. Thus, while traditional warehouse environments may not undertake large rearrangements due to inefficiencies for doing so, or that the benefit for doing so is outweighed by the cost, the warehouse 100 may be rearranged using robotic devices even in instances in which a small benefit results.

The warehouse 100 may be rearranged on a daily basis overnight, so as to achieve an optimal layout after a day of receiving and shipping items. The optimal layout may place the warehouse into a configuration optimal for a next business day. In other examples, the warehouse can be rearranged weekly, monthly, seasonally, or during time windows in which there is an available amount of time required to perform any desired rearrangement.

Further, some portions of the warehouse 100 can be rearranged while others remain in place. The WMS is programmable to perform any customized rearrangement of the warehouse 100.

Figure 4:
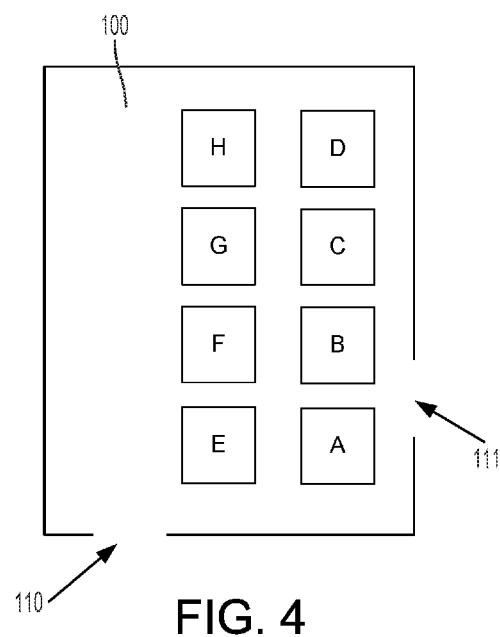
FIG. 4 illustrates an example layout of the warehouse including a number of pallets of items, labeled as pallets A-H, and shipping docks.
Figures 5, 6:
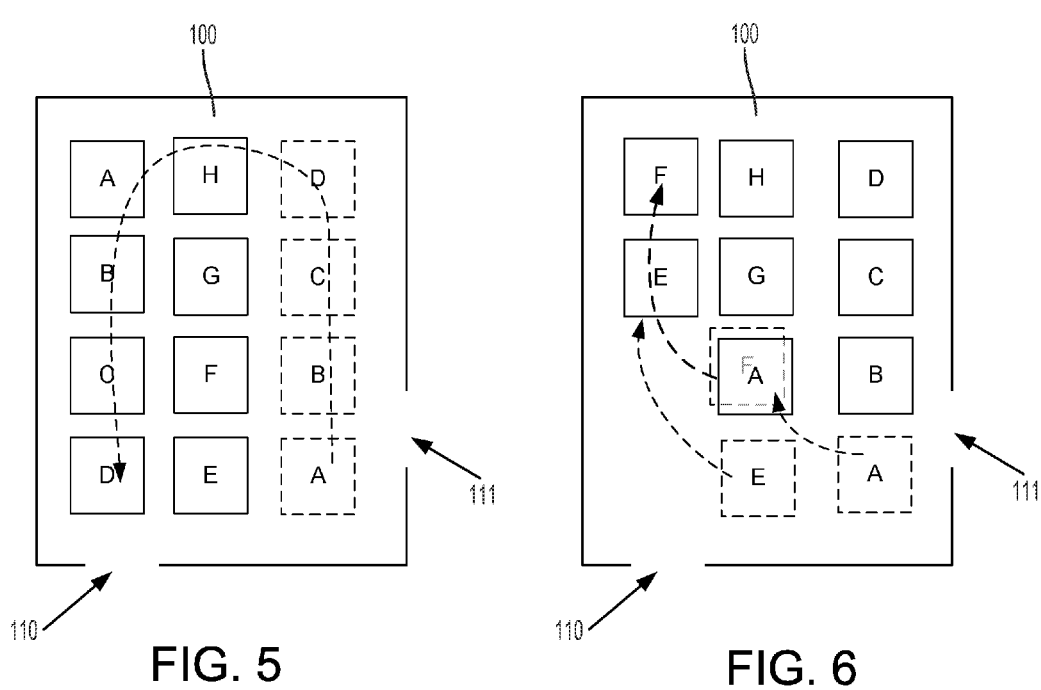
FIG. 5 illustrates an example rearrangement of the pallets A-H into the optimal layout.
FIG. 6 illustrates an example rearrangement of the pallets A, E, and F for an example layout.

FIGS. 4-6 illustrate example layouts of the warehouse. FIG. 4 illustrates an example layout of the warehouse 100 including a number of pallets of items, labeled as pallets A-H, and shipping docks 110 and 111. In FIG. 4, the pallets A-H are arranging in two rows, and shipping dock 111 is blocked.

An optimal layout of the warehouse 100 may be determined such that the shipping dock 111 is open and available for use, and thus, the pallets A-D may be relocated due to item shipment expectations using the shipping dock 111. FIG. 5 illustrates an example rearrangement of the pallets A-H into the optimal layout. For example, pallets A-D may be relocated to an open row on the other side of the row of pallets E-H. Once the pallets A-D are relocated, the shipping dock 111 is now available for use.

In another example, an optimal layout of the warehouse 100 may be determined such that both shipping docks 110 and 111 are open and available for use. FIG. 6 illustrates an example rearrangement of the pallets A, E, and F for this layout. For example, the pallets A, E, and F may each be shifted to an adjacent row to provide access to the shipping dock 111 while also leaving the shipping dock 110 open for use as well.

Some of these example layouts may be determined based also on item availability proximal to a shipping dock, and excess inventory of items can be repositioned to storage locations away from the shipping docks 110 and 111. As an example, pallets A and F may both contain the same items, and thus, the excess inventory on pallet F can be positioned into storage toward a rear of the warehouse 100. Or, more simply, the excess inventory on pallet F can be positioned away from the shipping docks 110 and 111. In other examples, layouts can be determined by positioning of items in a pallet rack (e.g., where slower moving or excess inventory is placed higher in a rack) or positioning of items in stacked pallets (e.g., where slower moving or excess inventory is placed at a bottom of stacks or deeper in the pallet lanes).

Figure 8:
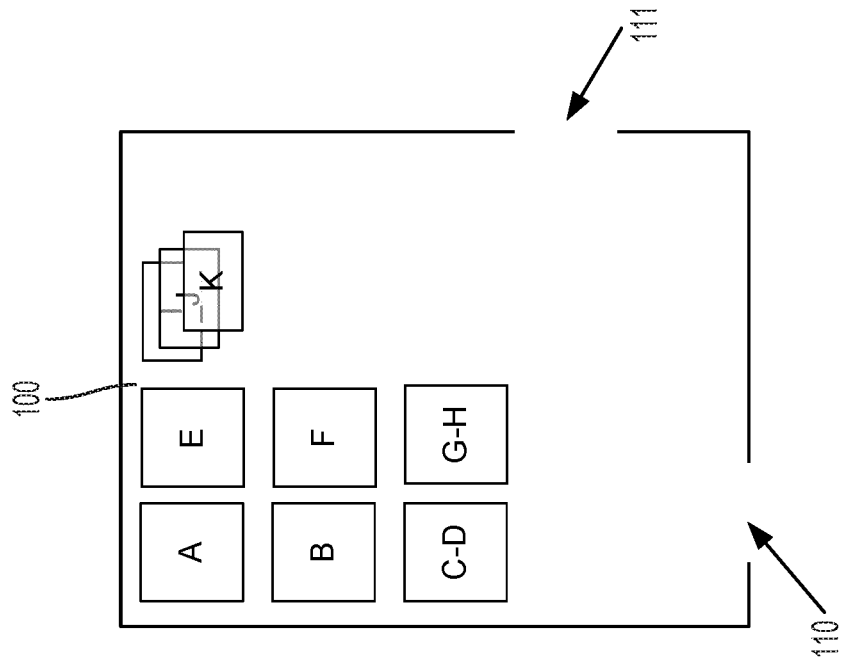
FIG. 8 illustrates an example optimal layout of the warehouse based on a maximum storage capacity arrangement of the warehouse.
Figure 7:
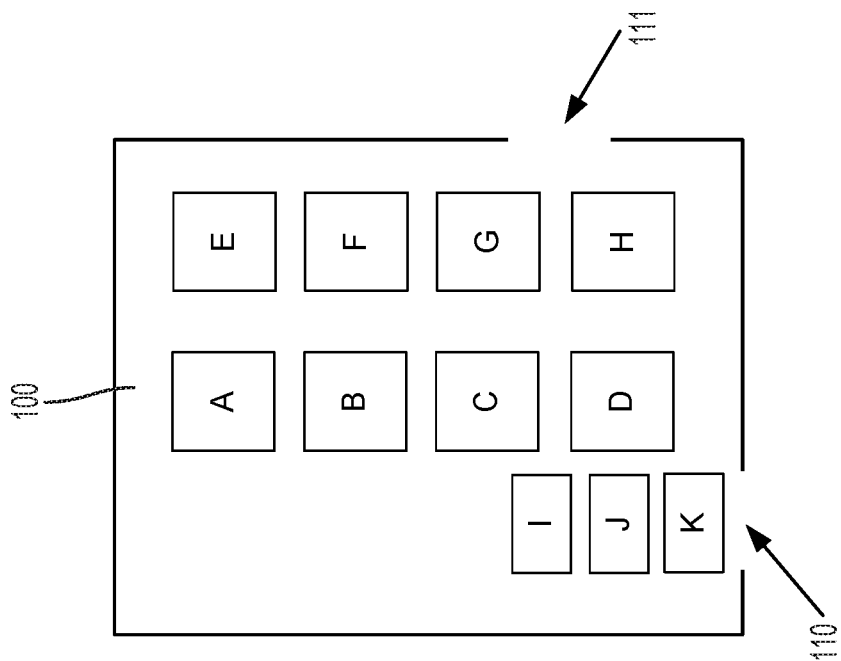
FIG. 7 illustrates another example layout of the warehouse including a number of pallets of items, labeled as pallets A-H, and shipping docks, and new pallets I-K received at the shipping dock.

In still other examples, FIGS. 7-8 illustrate further layouts of the warehouse 100. FIG. 7 illustrates an example layout of the warehouse 100 including a number of pallets of items, labeled as pallets A-H, and shipping docks 110 and 111. In addition, new pallets I-K have just been delivered and received at the shipping dock 110. FIG. 8 illustrates an example optimal layout of the warehouse 100 based on a maximum storage capacity arrangement of the warehouse 100. In this example, the pallets are positioned toward the walls of the warehouse, and some pallets may be combined, such as pallets C and D, and G and H. Further, the new pallets I-K that are of a different size may be stacked as well. This layout shown in FIG. 8 may be for a maximum storage capacity of the warehouse 100 given the size of the pallets in the warehouse 100.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing example implementations only, and is not intended to be limiting.

What is claimed is:

1. A method comprising:
   receiving, at a warehouse management system (WMS), real time inventory of items in a warehouse and real time location data of the items;
   identifying an item shipment expectation including new items expected to be received at the warehouse at a future date and items present at the warehouse marked for delivery at the future date, said identifying being performed by the WMS and based on one or more of a receiving record, an order fulfillment or a shipping record;
   receiving an indication of a user-selected throughput goal for the items in the warehouse;
   determining, based on the item shipment expectation, an optimal layout of the items for achieving the user-selected throughput goal;
   determining an amount of time for a robotic device to rearrange the items to the optimal layout based on a time measurement for the robotic device to perform a task;
   determining to rearrange the items of the warehouse based on the amount of time to rearrange the items being less than a threshold amount of time; and
   causing the robotic device to rearrange the items to the optimal layout.

2. The method of claim 1, wherein the items in the warehouse are arranged on pallets, and receiving the real time location data includes receiving information as to positioning of the pallets in the warehouse as well as a content of each pallet.

3. The method of claim 1, further comprising determining an optimal layout of the items based on a business goal including a date for a promotion on the items.

4. The method of claim 1, further comprising determining an optimal layout of the items based on forecasting of a quantity of items to be delivered.

5. The method of claim 1, further comprising:
   determining an optimal layout of the items based on item availability proximal to a shipping dock; and
   determining to reposition excess inventory of items to storage away from the shipping dock.

6. The method of claim 1, further comprising determining an optimal layout of the items based on a maximum storage capacity arrangement of the warehouse.

7. The method of claim 1, further comprising:
   optimizing the layout of the items of the warehouse based on an output of a cost function that considers at least the following parameters:
   an amount of expected time to deplete inventory;
   an amount of storage capacity required for inbound items; and
   one or more deadlines for a shipment of items.

8. The method of claim 1, further comprising:
   determining to rearrange the items based on the optimal layout satisfying an outbound throughput of items and providing a storage capacity requirement for the future date.

9. The method of claim 1, further comprising:
determining to rearrange the items of the warehouse based on a storage capacity requirement of the warehouse for the future date.

10. A system comprising:
a robotic device in a warehouse;
a processor; and
data storage comprising instructions executable by the processor to cause the system to perform operations comprising:
receiving real time inventory of the items in the warehouse and real time location data of the items;
identifying an item shipment expectation including new items expected to be received at the warehouse at a future date and items present at the warehouse marked for delivery at the future date, said identifying based on one or more of a receiving record, an order fulfillment record or a shipping record;
receiving an indication of a user-selected throughput goal for the items in the warehouse;
determining, based on the item shipment expectation, an optimal layout of the items for achieving the user-selected throughput goal;
determining an amount of time for the robotic device to rearrange the items to the optimal layout based on a time measurement for the robotic device to perform a task;
determining to rearrange the items of the warehouse based on the amount of time to rearrange the items being less than a threshold amount of time; and
causing the robotic device to rearrange the items to the optimal layout.

11. The system of claim 10, wherein the items in the warehouse are arranged on pallets, and receiving the real time location data includes receiving information as to positioning of the pallets in the warehouse as well as a content of each pallet.

12. The system of claim 10, wherein the operations further comprise:
determining an optimal layout of the items based on item availability proximal to a shipping dock; and
determining to reposition excess inventory of items into storage away from the shipping dock.

13. The system of claim 10, wherein the operations further comprise:
optimizing the layout of the items of the warehouse based on an output of a cost function that considers at least the following parameters:
an amount of expected time to deplete inventory;
an amount of storage capacity required for inbound items; and
one or more deadlines for a shipment of items.

14. The system of claim 10, wherein the operations further comprise:
determining an optimal layout of the items based on a business goal including a date for a promotion on the items.

15. A non-transitory computer-readable medium having stored thereon program instructions that when executed by a computing system that includes at least one processor cause the computing system to perform operations comprising:
receiving real time inventory of items in a warehouse and real time location data of the items;
identifying an item shipment expectation including new items expected to be received at the warehouse at a future date and items present at the warehouse marked for delivery at the future date, said identifying based on one or more of a receiving record, an order fulfillment or a shipping record;
receiving an indication of a user-selected throughput goal for the items in the warehouse;
determining, based on the item shipment expectation, an optimal layout of the items for achieving the user-selected throughput goal;
determining an amount of time for a robotic device to rearrange the items to the optimal layout based on a time measurement for the robotic device to perform a task;
determining to rearrange the items of the warehouse based on the amount of time to rearrange the items being less than a threshold amount of time; and
causing the robotic device to rearrange the items to the optimal layout.

16. The non-transitory computer-readable medium of claim 15, wherein the operations further comprise:
determining an optimal layout of the items based on item availability proximal to a shipping dock; and
determining to position excess inventory of items into storage away from the shipping dock.

17. The non-transitory computer-readable medium of claim 15, wherein the operations further comprise:
optimizing the layout of the items of the warehouse based on an output of a cost function that considers at least the following parameters:
an amount of expected time to deplete inventory;
an amount of storage capacity required for inbound items; and
one or more deadlines for a shipment of items.

18. The non-transitory computer-readable medium of claim 15, wherein the operations further comprise:
determining to rearrange the items based on the optimal layout satisfying an outbound throughput of items and providing a storage capacity requirement for the future date.

19. The non-transitory computer-readable medium of claim 15, wherein the operations further comprise:
determining to rearrange the items of the warehouse based on a storage capacity requirement of the warehouse for the future date.

20. The non-transitory computer-readable medium of claim 15, wherein the operations further comprise:
determining an optimal layout of the items based on a maximum storage capacity arrangement of the warehouse.

* * * * *